United States Patent
Wang et al.

(10) Patent No.: US 11,841,906 B2
(45) Date of Patent: Dec. 12, 2023

(54) METHOD, DEVICE, AND PRODUCT FOR MANAGING A PLURALITY OF USERS MATCHING A SEARCH KEYWORD OF APPLICATION SYSTEM BASED ON HIERARCHICAL RELATIONS AMONG THE PLURALITY OF USERS

(71) Applicant: EMC IP Holding Company LLC, Hopkinton, MA (US)

(72) Inventors: Qi Wang, Shanghai (CN); Travis Liu, Shanghai (CN); Scott Zhang, Shanghai (CN); Jerry Zhang, Shanghai (CN); Aaron Wang, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 184 days.

(21) Appl. No.: 16/775,139

(22) Filed: Jan. 28, 2020

(65) Prior Publication Data
US 2021/0089584 A1     Mar. 25, 2021

(30) Foreign Application Priority Data
Sep. 23, 2019   (CN) .......................... 201910899684.6

(51) Int. Cl.
*G06F 16/9035*     (2019.01)
*G06F 16/903*      (2019.01)
(Continued)

(52) U.S. Cl.
CPC ...... *G06F 16/9035* (2019.01); *G06F 16/9027* (2019.01); *G06F 16/9038* (2019.01); *G06F 16/90344* (2019.01)

(58) Field of Classification Search
CPC ............ G06F 16/9035; G06F 16/9038; G06F 16/90344; G06F 16/9027
(Continued)

(56) References Cited

U.S. PATENT DOCUMENTS

6,567,812 B1 * 5/2003 Garrecht ............. G06F 16/9038
707/708
7,743,051 B1 * 6/2010 Kashyap ............. G06F 16/2471
707/713
(Continued)

*Primary Examiner* — Tony Mahmoudi
*Assistant Examiner* — Michael Le
(74) *Attorney, Agent, or Firm* — WOMBLE BOND DICKINSON (US) LLP (57) ABSTRACT

The present disclosure relates to a method, device and product for managing a plurality of users of an application system. According to example implementations of the present disclosure, a method is provided for managing a plurality of users of an application system. In the method, a group of users matching a search keyword from a requester user are determined among the plurality of users, the search keyword comprising at least one part of an identifier of a desired user. A requester layer of the requester user is determined in a tree structure comprising hierarchical relations among the plurality of users. A group of layers of the group of users are determined in the tree structure, respectively. The group of users are sorted based on the requester layer and the group of layers. With example implementations of the present disclosure, a user which the requester user is looking for may be sorted at a top place so as to be selected by the requester user. Furthermore, there is provided a corresponding device and computer program product.

20 Claims, 9 Drawing Sheets

(51) Int. Cl.
*G06F 16/901* (2019.01)
*G06F 16/9038* (2019.01)

(58) Field of Classification Search
USPC .......................................................... 707/732
See application file for complete search history.

(56) References Cited

U.S. PATENT DOCUMENTS

| | | | | |
|---|---|---|---|---|
| 7,899,806 | B2* | 3/2011 | Aravamudan | G06F 3/0481 707/804 |
| 8,132,227 | B2* | 3/2012 | Kolz | G06F 21/6218 726/1 |
| 8,275,768 | B2* | 9/2012 | Guy | G06Q 10/00 707/732 |
| 8,977,613 | B1* | 3/2015 | Cooke | G06F 3/04842 707/754 |
| 2006/0129538 | A1* | 6/2006 | Baader | G06F 16/951 |
| 2006/0149834 | A1* | 7/2006 | Grason | G06F 16/972 709/219 |
| 2007/0124296 | A1* | 5/2007 | Toebes | G06F 16/951 |
| 2007/0276846 | A1* | 11/2007 | Ramanathan | G06Q 10/107 |
| 2008/0091412 | A1* | 4/2008 | Strope | G06F 16/9535 704/10 |
| 2008/0195586 | A1* | 8/2008 | Arnold | G06F 16/951 |
| 2009/0177688 | A1* | 7/2009 | Karlsen | G06Q 10/06 |
| 2009/0222298 | A1* | 9/2009 | Atmaja | G06Q 10/10 705/348 |
| 2010/0121685 | A1* | 5/2010 | Mahadevan | G06Q 10/06 705/7.39 |
| 2010/0121686 | A1* | 5/2010 | Mahadevan | G06Q 10/06393 705/7.39 |
| 2011/0106850 | A1* | 5/2011 | Li | G06F 16/335 707/E17.014 |
| 2011/0125732 | A1* | 5/2011 | Shnitko | G06F 16/334 707/723 |
| 2012/0124041 | A1* | 5/2012 | Bawri | G06Q 10/107 707/E17.014 |
| 2013/0086057 | A1* | 4/2013 | Harrington | G06F 16/951 707/E17.014 |
| 2013/0091149 | A1* | 4/2013 | Dunn | G06F 16/335 707/749 |
| 2013/0212479 | A1* | 8/2013 | Willis | G06Q 10/10 715/736 |
| 2014/0053110 | A1* | 2/2014 | Brown | G06Q 10/06 715/853 |
| 2014/0059705 | A1* | 2/2014 | Kuwako | H04L 63/104 726/28 |
| 2014/0081692 | A1* | 3/2014 | Bickell | G06Q 10/063118 705/7.17 |
| 2015/0074101 | A1* | 3/2015 | Solheim | G06F 16/9535 707/732 |
| 2015/0363403 | A1* | 12/2015 | Khalatov | G06Q 10/107 707/723 |
| 2016/0260063 | A1* | 9/2016 | Harris | G06Q 10/105 |
| 2016/0299896 | A1* | 10/2016 | Bawri | G06F 16/285 |
| 2016/0299954 | A1* | 10/2016 | Bawri | G06F 16/9038 |
| 2017/0004181 | A1* | 1/2017 | Ashall | G06F 16/9024 707/732 |
| 2017/0195329 | A1* | 7/2017 | Feng | H04L 63/102 |
| 2018/0253668 | A1* | 9/2018 | Wang | G06Q 10/1053 |
| 2018/0300387 | A1* | 10/2018 | Nk | G06Q 10/067 |
| 2020/0026804 | A1* | 1/2020 | Garg | G06F 16/2428 |

* cited by examiner

100

SEARCH RESULTS

| EMAIL ADDRESS | NAME |
| --- | --- |
| James.Wang@***.com | James Wang |
| James.Wang1@***.com | James Wang |
| James.Wang2@***.com | James Wang |
| James.Wang3@***.com | James Wang |
| James.Wang4@***.com | James Wang |

SEARCH RESULTS

810

| DISTANCE | EMAIL ADDRESS | NAME |
| --- | --- | --- |
| (1,1) | James.Wang@***.com | James Wang |
| (2,0) | James.Wang1@***.com | James Wang |
| (2,2) | James.Wang3@***.com | James Wang |
| (3,1) | James.Wang2@***.com | James Wang |
| (3,3) | James.Wang4@***.com | James Wang |

METHOD, DEVICE, AND PRODUCT FOR MANAGING A PLURALITY OF USERS MATCHING A SEARCH KEYWORD OF APPLICATION SYSTEM BASED ON HIERARCHICAL RELATIONS AMONG THE PLURALITY OF USERS

CROSS-REFERENCE TO RELATED APPLICATION

This patent application claims priority, under 35 U.S.C. § 119, of Chinese Patent Application No. 2019108996846, filed Sep. 23, 2019, entitled "Method, Device, and Computer Program Product for Managing Multiple Users in Application System."

FIELD

Various implementations of the present disclosure relate to the management of application systems, and more specifically, to a method, device and computer program product for managing a plurality of users of an application system.

BACKGROUND

With the development of computer technology, there have been provided various types of application systems. Take an email system (also referred to as a mail system) as one example. An enterprise or organization may comprise many employees, so a user account may be assigned to each employee in the mail system. For the sake of management, the name of an employee may be used as an identifier of a mail address. In general, the mail system of a large enterprise or organization may comprise thousands or even tens of thousands of users, and a plurality of employees may show up with the same name within the enterprise or organization.

For example, numeric suffixes may be used to differentiate different users. However, when a certain user is looked up in an application system, a plurality of users may be returned. At this point, it is a tough technical issue regarding how to manage a plurality of users in a more effective way and preferably return a user who is the most likely lookup target.

SUMMARY

Therefore, it is desirable to develop and implement a technical solution for managing a plurality of users of an application system more effectively. It is desired that the technical solution be compatible with an existing application system to manage a plurality of users of an application system more effectively by reconstructing configurations of the existing application system.

According to a first aspect of the present disclosure, there is provided a method for managing a plurality of users of an application system. In the method, a group of users matching a search keyword from a requester user are determined among the plurality of users, the search keyword comprising at least one part of an identifier of a desired user. A requester layer of the requester user is determined in a tree structure comprising hierarchical relations among the plurality of users. A group of layers of the group of users are determined in the tree structure, respectively. The group of users are sorted based on the requester layer and the group of layers.

According to a second aspect of the present disclosure, there is provided a device, comprising: at least one processor; a volatile memory; and a memory coupled to the at least one processor, the memory having instructions stored thereon, the instructions, when executed by the at least one processor, causing the device to perform acts for managing a plurality of users of an application system. The acts include: determining among the plurality of users a group of users matching a search keyword from a requester user, the search keyword comprising at least one part of an identifier of a desired user; determining a requester layer of the requester user in a tree structure comprising hierarchical relations among the plurality of users; determining a group of layers of the group of users in the tree structure, respectively; and sorting the group of users based on the requester layer and the group of layers.

According to a third aspect of the present disclosure, there is provided a computer program product. The computer program product is tangibly stored on a non-transient computer readable medium and comprises machine executable instructions which are used to implement a method according to the first aspect of the present disclosure.

BRIEF DESCRIPTION OF THE DRAWINGS

Through the more detailed description in the accompanying drawings, features, advantages and other aspects of the implementations of the present disclosure will become more apparent. Several implementations of the present disclosure are illustrated schematically and are not intended to limit the present invention. In the drawings.

DETAILED DESCRIPTION OF IMPLEMENTATIONS

The preferred implementations of the present disclosure will be described in more detail with reference to the drawings. Although the drawings illustrate the preferred implementations of the present disclosure, it should be appreciated that the present disclosure can be implemented in various manners and should not be limited to the implementations explained herein. On the contrary, the implementations are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example implementation" and "one implementation" are to be read as "at least one example implementation." The term "a further implementation" is to be read as "at least a further implementation." The terms "first", "second" and so on can refer to same or different objects. The following text also can comprise other explicit and implicit definitions.

For the sake of description, first an introduction is presented to the application environment of the present disclosure. Details of implementations of the present disclosure will be described by only taking a mail system as one example of the application system. It will be understood here the application system may further be an application system other than the mail system, including but not limited to a storage system, a communication system, a social network system, etc.

The application system may be the email system of an enterprise. Suppose the enterprise comprises a plurality of employees named "James Wang," then at this point they may be differentiated using numeric suffixes. For example, user identifiers "James.Wang," "James.Wang1," "James.Wang2" and so on may be assigned to the plurality of employees. When the user Matt (referred to as a requester user below) wants to send an email to the engineer James in his technical team, the application system may find a plurality of "James" and their corresponding email addresses.

Figure 1:
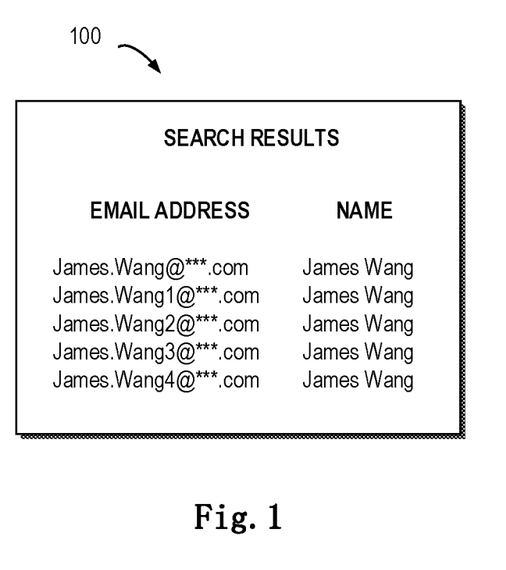
FIG. 1 schematically shows a block diagram of a search result of a search of a user in an application system.

As shown in FIG. 1, this figure schematically shows a block diagram of a search result 100 of searching users in the application system. In the search result as shown in FIG. 1, the plurality of "James" may comprise an engineer, a department manager, an engineer in other department, and the like. At this point, maybe the requester can hardly tell which one is the engineer James he/she is looking for. The requester user has to make additional verifications to find the desired target user, e.g., through photos, job descriptions, etc.

Figure 2:
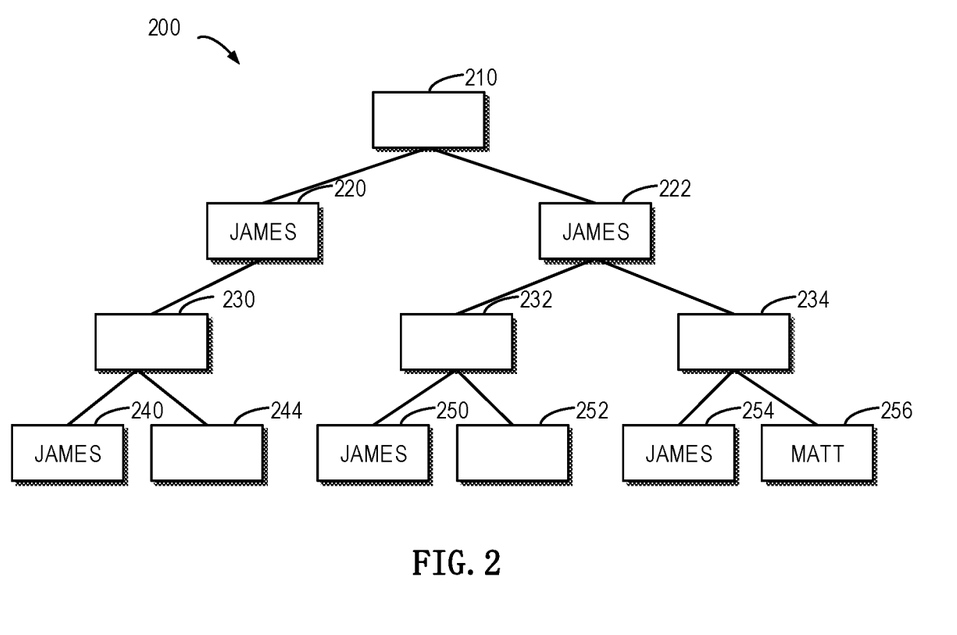
FIG. 2 schematically shows a block diagram of a tree structure comprising hierarchical relations among a plurality of users of an application system according to one implementation of the present disclosure.

In order to solve the above drawbacks, implementations of the present disclosure provide a technical solution for managing a plurality of users of an application system. With reference to FIG. 2, description is presented to a tree structure used in the technical solution as proposed. This figure schematically shows a block diagram of a tree structure 200 comprising hierarchical relations among a plurality of users of an application system according to one implementation of the present disclosure. As depicted in FIG. 2, nodes in the tree structure 200 may represent users in the application system.

The tree structure 200 may comprise a plurality of layers, for example, a root node 210 may represent a general manager, and child nodes 220 and 222 of the root node 210 may represent technical managers of two technical departments which the general manager is in charge of. For the node 220, it may further comprise a child node 230 that represents a subordinate (e.g., technical team leader), and the child node 230 may further comprise nodes 240 and 244 representing technical engineers. Similarly, the node 222 may comprise child nodes 232 and 234, among which the child node 232 may further comprise child nodes 250 and 252 and the child node 234 may further comprise child nodes 254 and 256. It will be understood that in the tree structure, one node represents one user, so nodes and users may not be differentiated for the sake of simplicity.

According to example implementations of the present disclosure, nodes may live in their own layers. For example, the root node 210 may live in layer 0, the root 220 may live in layer 1, the node 230 may live in layer 2, and so on and so forth. According to example implementations of the present disclosure, a user represented by a child node in the tree structure is a subordinate of a user represented by a father node in the tree structure. For example, the root node 210 represents the general manager, and the nodes 220 and 222 represent child nodes of the root node 210 and may represent technical managers of two technical departments the general manager is in charge of.

Suppose the user Matt (requester user) represented by the node 256 wants to send an email to the engineer James in his technical team. By searching with the keywords "James Wang," a group of users will be returned, e.g., users represented by the nodes 240, 220, 222, 250 and 254. In order to manage a plurality of users in the application system in a more convenient way, the present disclosure proposes to sort a group of users based on a layer of a requester user and layers of respective users in the found group of users. At this point, the sorted group of users may reflect hierarchical relations among respective found users and the requester user, which helps to find the user whom the requester user is looking for.

Figure 3:
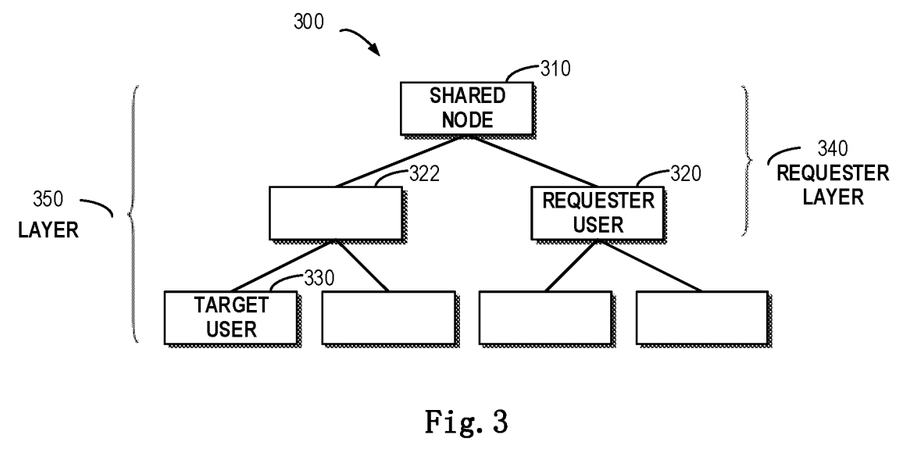
FIG. 3 schematically shows a block diagram for managing a plurality of users of an application system according to one implementation of the present disclosure.

With reference to FIG. 3, description is presented below to an outline of the technical solution for managing a plurality of users of an application system. FIG. 3 schematically shows a block diagram 300 for managing a plurality of users of an application system according to one implementation of the present disclosure. A group of users matching a search keyword may be found from the plurality of users of the application system based on keyword matching. Suppose a target user 330 in FIG. 3 is a user in the found group of users, it may be determined that the target user 330 lives in a layer 350 in the tree structure 200, and further it may be determined that a requester user 320 lives in a requester layer 340 in the tree structure 200. In the context of the present disclosure, it will be understood that the layer refers to a layer in the tree structure 200 in which a node representing a user lives in. For example, the requester layer of the requester user 320 may be represented as layer 1, and the layer 350 of the target user 330 may be represented as layer 2.

According to example implementations of the present disclosure, users in the same or similar layers to the requester may be sorted at top places. Usually such a circumstance may exist in an enterprise that a leader such as a manager assigns tasks and sends emails to subordinates. At this point, by sorting users with lower layers at top places, it is easy to select from the header of a search result a target user to whom an email is destined.

Figure 4:
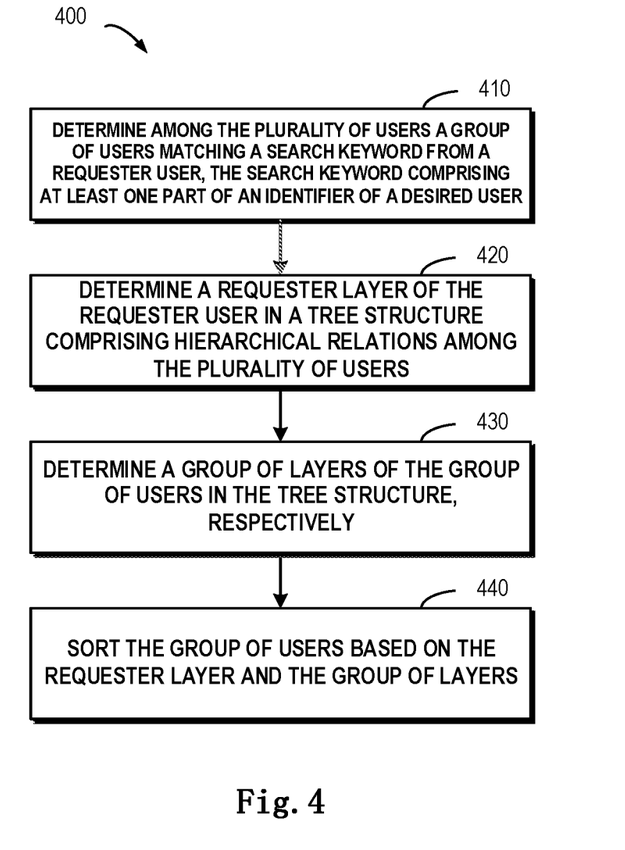
FIG. 4 schematically shows a flowchart of a method for managing a plurality of users of an application system according to one implementation of the present disclosure.

With reference to FIG. 4, detailed description is presented below to more details about example implementations of the present disclosure. This figure schematically shows a flowchart of a method 400 for managing a plurality of users of an application system according to one implementation of the present disclosure. At block 410, a group of users matching a search keyword from a requester user are determined from the plurality of users. The search keyword may comprise the entirety or part of an identifier of an expected user. For example, the requester user 320 may input a full name "James Wang" of the expected user. Alternatively and/or additionally, the keyword inputted here may further be part of the identifier of the user, such as "James." At this point, a group of users may be found based on keyword matching.

At block 420, a requester layer of the requester user is determined in the tree structure 200 comprising hierarchical relations among the plurality of users. At block 430, a group of layers of the group of users are determined in the tree structure 200. Here, each user may have his/her own layer. At block 440, the group of users may be sorted based on the requester layer and the determined group of layers.

According to example implementations of the present disclosure, a group of shared nodes between the group of users and the requester user may be determined based on the requester layer and the group of layers, and the group of users may be sorted based on the group of shared nodes. Example implementations of the present disclosure introduce the concept of "shared node," here the shared node represents a father node which is shared between a target user in the group of users and the requester user with the shortest distance. In other words, the layer of the shared node is closest to the target user and the requester user.

Therefore, regarding the target user in the group of users, a shared node between the target user and the requester user may be determined. The position of the shared node may reflect a range to which both the target user and the requester user belong. Returning to FIG. 2, regarding the found target node 254, a shared node between the target node 254 and the requester user 256 is the node 234. Since the node 234 represents a leader with a specific technical team, at this point the target node 254 and the requester user 256 belong to the same technical team, and further it may be considered they have close relevance.

For another example, regarding the target node 250 in FIG. 2, a shared node between the target node 250 and the requester user 256 is the node 222. Since the node 222 represents a manager with a specific technical department, at this point the target node 250 and the requester user 256 belong to the same technical department, and further it may be considered they have medium relevance. For another example, regarding the target node 240 in FIG. 2, a shared node between the target node 240 and the requester user 256 is the node 210. Since the node 210 represents the general manager of the enterprise, at this point the target node 240 and the requester user 256 belong to the same enterprise, and further it may be considered they have alienated relevance.

According to example implementations of the present disclosure, the sorting may be based on distances between shared nodes and the requester. For example, the sorting may be implemented in order of target user 254-target user 250-target user 240. In this way, the requester user 256 may select a user with close relevance from top users. It will be understood that the shared node here is a node at the lowest layer in the tree structure 200 which satisfies hierarchical relations. In other words, the layer of the shared node is supposed to be close as possible to the layer of the requester user.

It will be understood that a most common scenario in the enterprise is that the requester user wants to find a most relevant user. Therefore, by sorting the group of shared nodes, various users as found may be sorted based on their intimacy with the requester. With example implementations of the present disclosure, it is convenient for the requester user to find the desired user.

According to example implementations of the present disclosure, the distance between each user in the group of users and the requester user may be determined based on the group of shared nodes. Specifically, according to example implementations of the present disclosure, the distance between the target user and the requester user may be determined based on the shared node so as to determine the intimacy between two users more accurately. Specifically, the concepts of requester distance and target distance are proposed. Here the requester distance refers to the distance between the shared node and the requester user, and the target distance refers to the distance between the shared node and the target user. With reference to FIG. 2, regarding the shared node 234, the requester distance from it to the requester user 256 is 1, and the target distance from it to the target node 254 is 1. For another example, regarding the shared node 222, the requester distance from it to the requester user 256 is 2, and the target distance from it to the target node 254 is 2. The distance between the requester user 256 and the target user 254 may be determined based on the requester distance and the target distance.

According to example implementations of the present disclosure, a requester weight and a target weight may be assigned to the requester distance and the target distance respectively, where the requester weight may be different from the target weight. Usually it is more common in an enterprise that a superior assigns tasks to subordinates, so most reasons for sending emails is that the superior wants to communicate with subordinates. At this point, it may be considered the importance of the requester distance between the requester user and the shared node is higher than that of the target distance between the target user and the shared node, so a higher weight is supposed to be assigned to the requester distance. According to example implementations of the present disclosure, the distance between the target user and the requester user may be determined based on the requester distance, the target distance, the requester weight as well as the target weight. Specifically, the distance between two users may be determined based on Formula 1 below.

$$\text{Dist}(\text{req},\text{tar}) = W_{req} * \text{Dist}_{req} + W_{tar} * \text{Dist}_{tar} \qquad \text{Formula 1}$$

In Formula 1, Dist(req, tar) denotes the distance between the requester user and the target user, $W_{req}$ and $W_{tar}$ denote the requester weight and the target weight respectively, and $\text{Dist}_{req}$ and $\text{Dist}_{tar}$ denote the requester distance and the target distance respectively. It will be understood that the above Formula 1 is merely schematic, and the distance between the requester user and the target user may further be determined based on other formula, e.g., Formula 2 below.

$$\text{Dist}(\text{req},\text{tar}) = W_{req} * \text{Dist}_{req} * W_{tar} * \text{Dist}_{tar} \qquad \text{Formula 2}$$

According to example implementations of the present disclosure, the requester weight may be set far greater than the target weight. For example, such a setting may be effected by: $W_{req}=0\text{x}100$, $W_{tar}=0\text{x}1$. At this point, the requester weight may be set to a hexadecimal value 0x100, while the target weight may be set to a hexadecimal value 0x1. The distance from each user in the group of users to the requester user may be determined based on Formula 1 described above.

Figure 5:
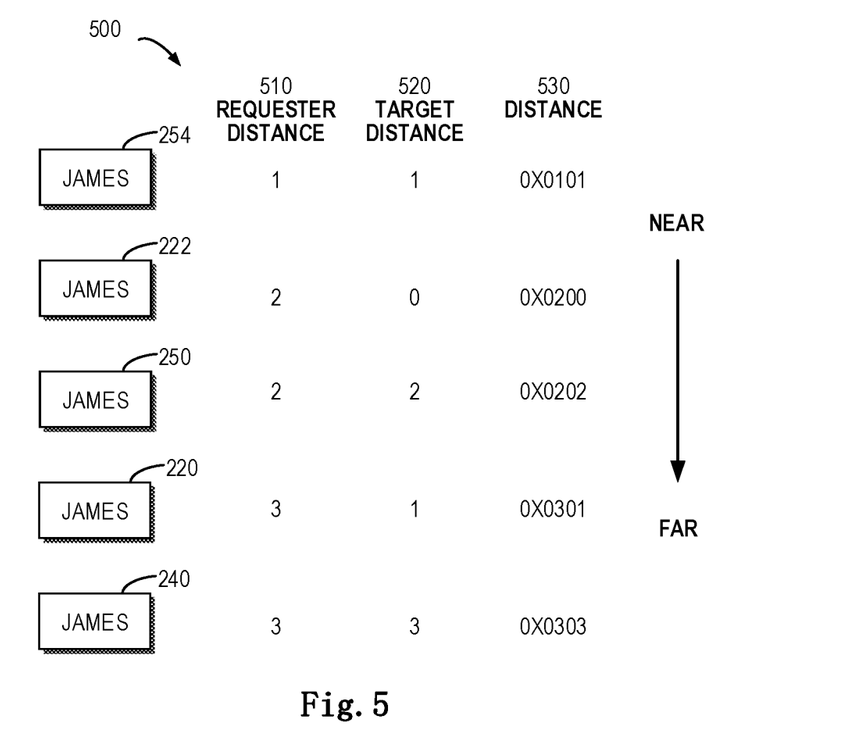
FIG. 5 schematically shows a block diagram of sorting a plurality of users according to one implementation of the present disclosure.

With reference to FIG. 5, description is presented below to a specific procedure of sorting the group of users as found in FIG. 2. FIG. 5 schematically shows a block diagram 500 for sorting a plurality of users according to one implementation of the present disclosure. The found group of users with the keyword "James" may comprise the users 254, 222, 250, 220 and 240 as described in FIG. 2. A requester distance 510, a target distance 520 and a distance 530 associated with each user may be determined according to the above method 400. As shown in FIG. 5, regarding the user 254, both the requester distance and the target distance are 1, and based on Formula 1, the distance may be determined as 0x1*1+ 0x100*1=0x0101. Similarly, distances associated with the users 222, 250, 220 and 240 are 0x0200, 0x0202, 0x0301 and 0x0303 respectively. At this point, these users may be sorted in near-to-far order by distance, and a result may be obtained as shown in FIG. 5: users 254, 222, 250, 220 and 240.

According to the example shown in FIG. 5, the found group of users may be sorted in near-to-far order by distance. At this point, a user at a top place is in a close relationship with the requester user, and a user at a lower place is in an alienated relationship with the requester user. With example implementations of the present disclosure, it is easy for the requester user to select an intimate user.

Figure 6A:
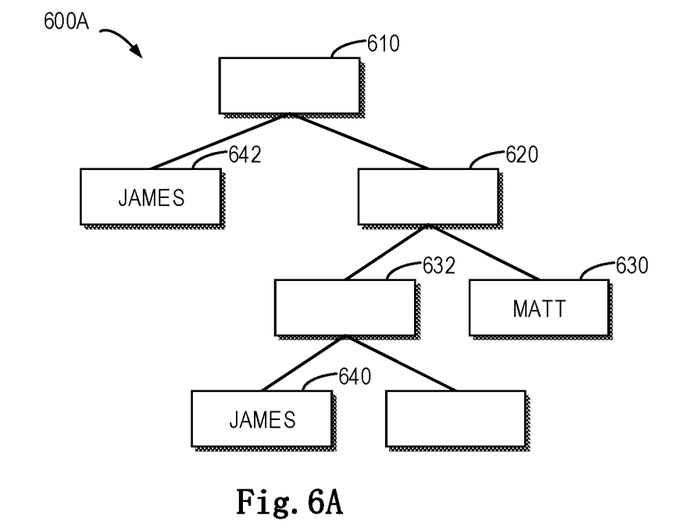
FIG. 6A schematically shows a block diagram of a tree structure comprising hierarchical relations among a plurality of users according to one implementation of the present disclosure.

By assigning different weights to the requester distance and the target distance, on the one hand, more consideration may be given to the distance between the requester user and the shared node, and on the other hand, "draws" may be reduced when determining distances. More details will be described with reference to FIGS. 6A to 6C. FIG. 6A schematically shows a block diagram of a tree structure 600A comprising hierarchical relations among a plurality of users according to one implementation of the present disclosure. As depicted, the tree structure 600A comprises a root node 610, which has two child nodes 642 and 620. Further, the child node 620 may have direct or indirect child nodes. In the tree structure 600A, a root 630 represents the requester user Matt. Suppose a group of users as found consist of two users, which are represented by nodes 642 and 640 respectively.

Figure 6B:
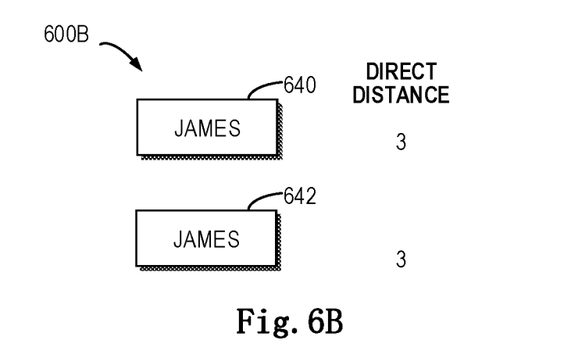
FIG. 6B schematically shows a block diagram of sorting a group of users based on direct distances according to one implementation of the present disclosure.

A direct distance may be determined according to the length of a path from the requester user to the target user. FIG. 6B schematically shows a block diagram 600B of sorting a group of users based on direct distances according to one implementation of the present disclosure. At this point, the path between the node 640 and the requester user 630 is node 640-node 632-node 620-node 630, so the direct distance is 3. The path between the node 642 and the requester user 630 is node 642-node 610-node 620-node 630, so the direct distance is also 3. If the two target users are sorted based on direct distances, since their direct distances to the requester users are equal, a draw arises.

Figure 6C:
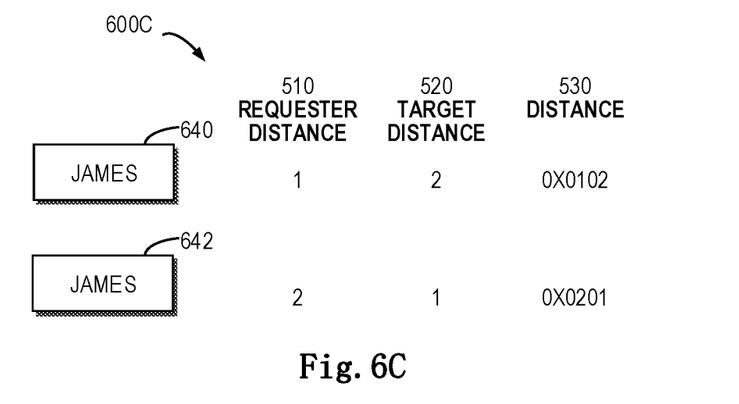
FIG. 6C schematically shows a block diagram of sorting a group of users based on requester distances and target distances according to one implementation of the present disclosure.

Unlike FIG. 6B, FIG. 6C schematically shows a block diagram 600C of sorting a group of users based on the requester distance and the target distance according to one implementation of the present disclosure. Since different weights are assigned to the requester distance and the target distance, resultant distances for the users 640 and 642 are 0x0102 and 0x0201 respectively. The sorting may be implemented in ascending order by distance. As shown in FIG. 6C, the shared node 620 between the user 640 and the requester user 630 lives in a lower layer and is much closer to the requester user, so the user 640 may be sorted at the first place. Since the shared node 610 between the user 642 and the requester user 630 lives in a higher layer and is far away from the requester user, the user 640 may be sorted at the second place.

Figure 7A:
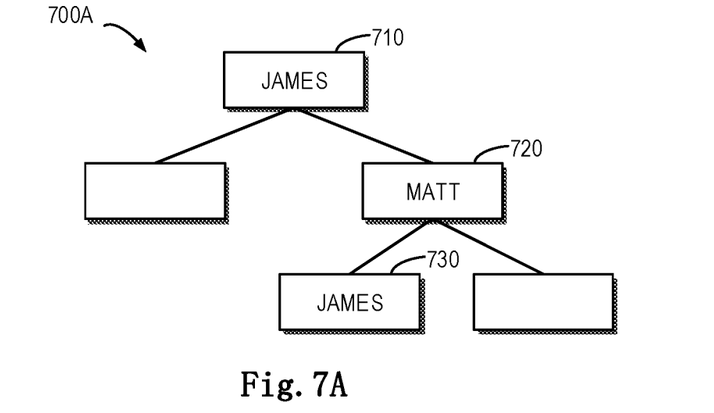
FIG. 7A schematically shows a block diagram of a tree structure comprising hierarchical relations among a plurality of users according to one implementation of the present disclosure.

FIG. 7A schematically shows a block diagram of a tree structure 700A comprising hierarchical relations among a plurality of users according to one implementation of the present disclosure. This figure illustrates a circumstance in which the requester user per se is the shared node between the requester user and a found user. As depicted, a group of users as found consist of users 710 and 730, which are a father node and a child node of a requester user 720, respectively. If the users 710 and 730 are sorted according to direct distances, since two distances associated with them are both 1, a draw arises.

Figure 7B:
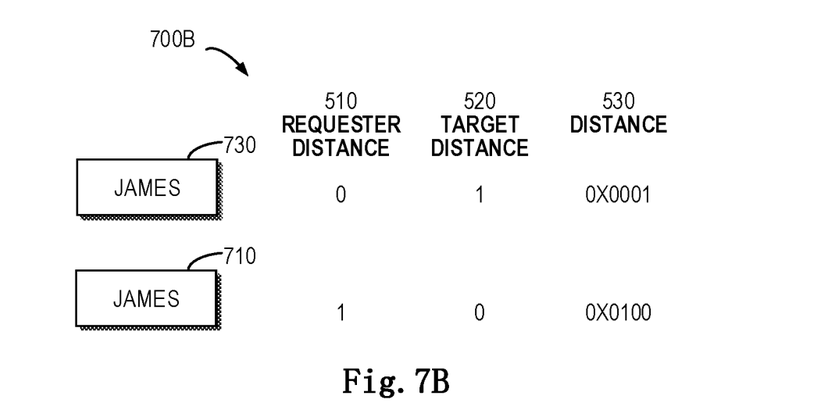
FIG. 7B schematically shows a block diagram of sorting a group of users based on requester distances and target distances according to one implementation of the present disclosure.

FIG. 7B schematically shows a block diagram 700B of sorting a group of users based on the requester distance and the target distance according to one implementation of the present disclosure. It may be determined from Formula 1 above that distances associated with the users 730 and 710 are 0x0001 and 0x0100, respectively, so the user 730 may be sorted at the first place while the user 710 is sorted at the second place. Returning to FIG. 7A, the user 730 is a subordinate of the requester user 720, while the user 710 is a superior of the requester user 720. It is more common in enterprises that a requester user assigns tasks to subordinates. Accordingly, in example implementations of the present disclosure, a desired user may be found preferentially by assigning a higher weight to the requester distance.

According to example implementations of the present disclosure, a ratio between two weights may be determined based on hierarchical depth of the tree structure 200. Specifically, the tree structure may be traversed, so that a layer of a leaf node with the largest depth is used as the hierarchical depth of the tree structure. The requester weight and the target weight may be determined based on the hierarchical depth. For example, the requester weight may be set to a multiple of the target weight, at which point the ratio between the requester weight and the target weight may be set greater than or equal to (hierarchical depth-1).

In one example, the ratio may be set equal to the hierarchical depth. Returning to the example of FIG. 7A, the tree structure 700A comprises 3 layers, so its hierarchical depth is 3, and further the ratio between the requester weight and the target weight may be set to 3. If the target weight is 1, then the requester weight is 3. At this point, distances for the users 730 and 710 which are determined based on Formula 1 are 1 and 3, respectively. Since 1<3, the user 730 may be sorted at the first place, while the user 710 may be sorted at the second place. In one example, the ratio may be set to (hierarchical depth-1). At this point, if the target weight is 1, then the requester weight may be set to 3−1=2. Distances for the users 730 and 710 which are determined based on Formula 1 are 1 and 2, respectively. Since 1<2, the user 730 may still be sorted at the first place.

Figure 8:
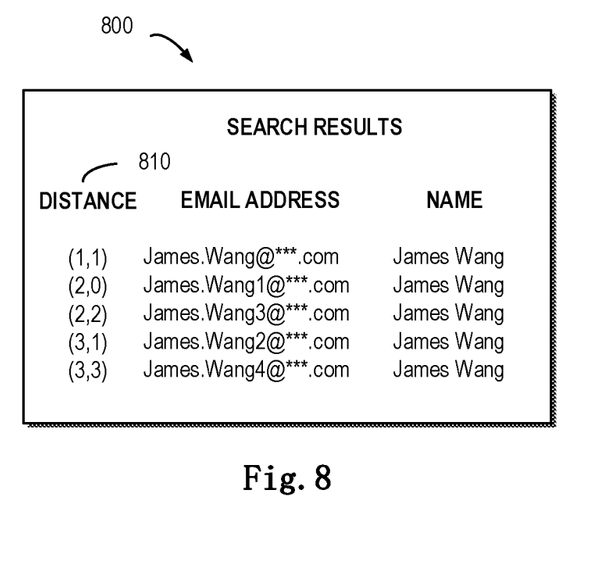
FIG. 8 schematically shows a block diagram of a search result of searching a user in an application system according to one implementation of the present disclosure.

According to example implementations of the present disclosure, the group of users that have been sorted may be displayed to the requester user. FIG. 8 schematically shows a block diagram 800 of a search result of searching a user in an application system according to one implementation of the present disclosure. As depicted, the group of users as found may be sorted based on an ultimate distance 810 determined according to the requester distance and the target distance. The group of users that have been sorted may be presented to the requester user in a visual way. Further, more information about the group of users may be presented. For example, when the mouse hovers over an identifier of a certain user, the user's information, such as picture, sex, age and position may be displayed.

According to example implementations of the present disclosure, an operation may be performed on a user selected by the requester user. Specifically, an operation to be performed on at least one of the plurality of users may be determined. Here the operation comprises at least one of: a communication operation, an authorization operation and an invitation operation. For example, a certain manager in an enterprise may initiate a technical seminar and send email notices to relevant engineers. Suppose a subordinate engineer of the manager and the general manager of the enterprise are both called "James," then according to the above method, the engineer "James" may be sorted before the general manager "James." In this way, it is easy for the requester user to select a desired user. Subsequently, in accordance with determining the requester user selects at least one user from the group of sorted users, an operation may be performed on the selected at least one user. At this point, an email may be sent to the selected at least one user to inform him/her of the technical seminar.

Although the technical solution for managing a plurality of users has been described by taking an email system as one example of the application system, according to example implementations of the present disclosure, different operations may be performed on selected users in other types of application systems. For example, in a storage system, the administrator of a sub-system wants to assign access permission to a user James in the sub-system the administrator is in charge of. Suppose the name of the administrator of another sub-system in the storage system is also "James." According to the above method, the user "James" in the sub-system may be sorted before the administrator "James" in a search result.

While examples of the method according to the present disclosure have been described in detail with reference to FIGS. 2 to 8, description is presented below to the implementation of a corresponding apparatus. According to example implementations of the present disclosure, provided is an apparatus for managing a plurality of users of an application system. The apparatus comprises: a search module configured to determine among the plurality of users a group of users matching a search keyword from a requester user, the search keyword comprising at least one part of an identifier of a desired user; a requester layer determining module configured to determine a requester layer of the requester user in a tree structure comprising hierarchical relations among the plurality of users; a layer determining module configured to determine a group of layers of the group of users in the tree structure, respectively; and a sorting module configured to sort the group of users based on the requester layer and the group of layers.

According to example implementations of the present disclosure, the sorting module comprises: a node determining module configured to determine a group of shared nodes between the group of users and the requester user based on the requester layer and the group of layers, a shared node in the group of shared nodes representing a father node with the shortest distance shared between a user in the group of users and the requester user; and a node sorting module configured to sort the group of users based on the group of shared nodes.

According to example implementations of the present disclosure, the node sorting module comprises: a distance determining module configured to determine a group of distances between the group of users and the requester user based on the group of shared nodes; and a distance sorting module configured to sort the group of users based on the group of distances.

According to example implementations of the present disclosure, the distance determining module further comprises: a requester distance determining module configured to determine a requester distance between a shared node and the requester user; a target distance determining module configured to determine a target distance between the shared node and a target user; and the distance determining module is further configured to determine the distance between the target user and the requester user based on the requester distance and the target distance.

According to example implementations of the present disclosure, the distance determining module further comprises: an assigning module configured to assign a requester weight and a target weight to the requester distance and the target distance respectively, the requester weight being different from the target weight; and the distance determining module is further configured to determine the distance between the requester distance, the target distance, the requester weight and the target weight.

According to example implementations of the present disclosure, the requester weight is greater than the target weight.

According to example implementations of the present disclosure, the apparatus further comprises: a depth determining module configured to determine hierarchical depth of the tree structure; and a ratio determining module configured to determine a ratio between the requester weight and the target weight based on the hierarchical depth.

According to example implementations of the present disclosure, a user represented by a child node in the tree structure is a subordinate of a user represented by a father node in the tree structure.

According to example implementations of the present disclosure, the apparatus further comprises: an operation determining module configured to determine an operation to be performed on at least one user of the plurality of users; and a performing module configured to, in accordance with determining the requester user selects the at least one user in the group of sorted users, perform the operation on the selected at least one user.

According to example implementations of the present disclosure, the operation comprises at least one of: a communication operation, an authorization operation and an invitation operation.

Figure 9:
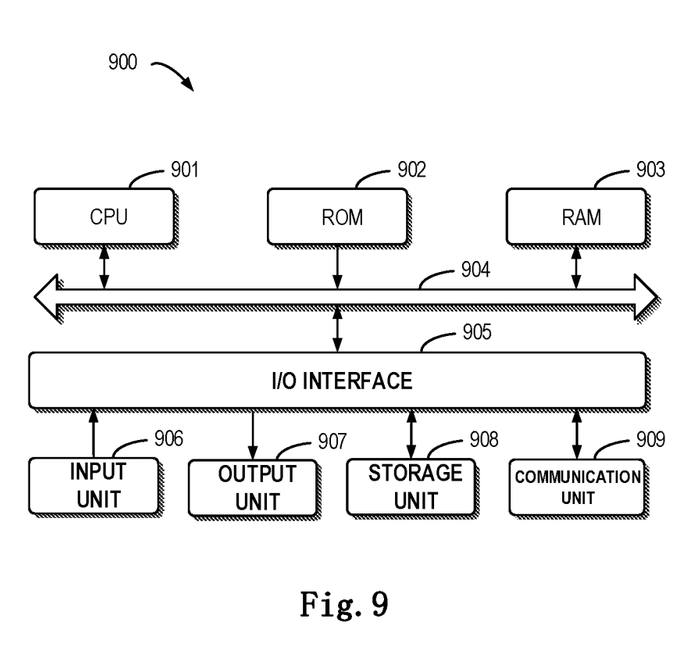
FIG. 9 schematically shows a block diagram of a device for managing a plurality of users of an application system according to example implementations of the present disclosure.

FIG. 9 schematically shows a block diagram of a device 900 for managing a plurality of users of an application system according to example implementations of the present disclosure. As depicted, the device 900 includes a central processing unit (CPU) 901, which can execute various suitable actions and processing based on the computer program instructions stored in the read-only memory (ROM) 902 or computer program instructions loaded in the random-access memory (RAM) 903 from a storage unit 908. The RAM 903 can also store all kinds of programs and data required by the operations of the device 900. CPU 901, ROM 902 and RAM 903 are connected to each other via a bus 904. The input/output (I/O) interface 905 is also connected to the bus 904.

A plurality of components in the device 900 is connected to the I/O interface 905, including: an input unit 906, such as keyboard, mouse and the like; an output unit 907, e.g., various kinds of display and loudspeakers etc.; a storage unit 908, such as magnetic disk and optical disk etc.; and a communication unit 909, such as network card, modem, wireless transceiver and the like. The communication unit 909 allows the device 900 to exchange information/data with other devices via the computer network, such as Internet, and/or various telecommunication networks.

Each of the above described process and treatment, such as the method 400 can also be executed by the processing unit 901. For example, in some implementations, the method 400 can be implemented as a computer software program tangibly included in the machine-readable medium, e.g., the storage unit 908. In some implementations, the computer program can be partially or fully loaded and/or mounted to the device 900 via ROM 902 and/or the communication unit 909. When the computer program is loaded to the RAM 903 and executed by the CPU 901, one or more steps of the above described method 400 can be implemented. Alternatively, in other implementations, the CPU 901 also can be configured in other suitable manners to realize the above procedure/method.

According to example implementations of the present disclosure, there is provided a device, comprising: at least one processor; a volatile memory; and a memory coupled to the at least one processor, the memory having instructions stored thereon, the instructions, when executed by the at least one processor, causing the device to perform acts for managing a plurality of users of an application system. The acts include: determining among the plurality of users a group of users matching a search keyword from a requester user, the search keyword comprising at least one part of an identifier of a desired user; determining a requester layer of the requester user in a tree structure comprising hierarchical relations among the plurality of users; determining a group of layers of the group of users in the tree structure, respectively; and sorting the group of users based on the requester layer and the group of layers.

According to example implementations of the present disclosure, sorting the group of users based on the requester layer and the group of layers comprises: determining a group of shared nodes between the group of users and the requester user based on the requester layer and the group of layers, a shared node in the group of shared nodes representing a father node with the shortest distance shared between a user in the group of users and the requester user; and sorting the group of users based on the group of shared nodes.

According to example implementations of the present disclosure, sorting the group of users based on the group of shared nodes comprises: determining a group of distances between the group of users and the requester user based on the group of shared nodes; and sorting the group of users based on the group of distances.

According to example implementations of the present disclosure, determining a group of distances between the group of users and the requester user based on the group of shared nodes comprises: regarding a shared node of a target user in the group of users, determining a requester distance between the shared node and the requester user; determining a target distance between the shared node and the target user; and determining the distance between the target user and the requester user based on the requester distance and the target distance.

According to example implementations of the present disclosure, determining the distance between the target user and the requester user based on the requester distance and the target distance comprises: assigning a requester weight and a target weight to the requester distance and the target distance, respectively, the requester weight being different from the target weight; and determining the distance between the requester distance, the target distance, the requester weight and the target weight.

According to example implementations of the present disclosure, the requester weight is greater than the target weight.

According to example implementations of the present disclosure, the acts further comprise: determining hierarchical depth of the tree structure; and determining a ratio between the requester weight and the target weight based on the hierarchical depth.

According to example implementations of the present disclosure, a user represented by a child node in the tree structure is a subordinate of a user represented by a father node in the tree structure.

According to example implementations of the present disclosure, the acts further comprise: determining an operation to be performed on at least one user of the plurality of users; and in accordance with determining the requester user selects the at least one user in the group of sorted users, performing the operation on the selected at least one user.

According to example implementations of the present disclosure, the operation comprises at least one of: a communication operation, an authorization operation and an invitation operation.

According to example implementations of the present disclosure, there is provided a computer program product. The computer program product is tangibly stored on a non-transient computer readable medium and comprises machine executable instructions which are used to implement the method according to the present disclosure.

According to example implementations of the present disclosure, there is provided a computer readable medium. The computer readable medium has machine executable instructions stored thereon, the machine executable instructions, when executed by at least one processor, causing the at least one processor to implement the method according to the present disclosure.

The present disclosure can be a method, device, system and/or computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but is not limited to, an electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instructions can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combinations of one or more programming languages, where the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where a remote computer is involved, the remote computer can be connected to the user computer via any type of network, including local area network (LAN) and wide area network (WAN), or to the external computer (e.g., connected via Internet using an Internet service provider). In some implementations, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to flow charts and/or block diagrams of method, apparatus (system) and computer program products according to implementations of the present disclosure. It should be understood that each block of the flow charts and/or block diagrams and the combination of various blocks in the flow charts and/or block diagrams can be implemented by computer-readable program instructions.

The computer-readable program instructions can be provided to the processing unit of a general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatuses and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into a computer, other programmable data processing apparatuses or other devices, so as to execute a series of operation steps on the computer, the other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow charts and block diagrams in the drawings illustrate system architecture, functions and operations that may be implemented by system, method and computer program products according to a plurality of implementations of the present disclosure. In this regard, each block in the flow chart or block diagram can represent a module, a part of program segment or code, where the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order depending on the functions involved. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various implementations of the present disclosure have been described above and the above description is only exemplary rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each implementation and technical improvements made in the market by each implementation, or enable others of ordinary skill in the art to understand implementations of the present disclosure.

We claim:

1. A method for managing a plurality of users of an application system, the method comprising:
   determining among the plurality of users a group of users matching a search keyword from a requester user, the search keyword comprising at least one part of an identifier of a desired user;
   determining a requester layer of the requester user in a tree structure comprising hierarchical relations among the plurality of users;
   determining a hierarchical depth of the tree structure;
   determining a group of layers of the group of users in the tree structure, respectively; and
   sorting the group of users based on the requester layer and the group of layers, comprising:
      determining a group of shared nodes between the group of users and the requester user based on the requester layer and the group of layers, respectively, a shared node in the group of shared nodes representing a father node with a shortest distance shared between a user in the group of users and the requester user; and
      sorting the group of users based on the group of shared nodes, comprising:

determining a ratio between a requester weight and
a target weight based on the hierarchical depth of
the tree structure;
determining a group of distances between the group
of users and the requester user based on the group
of shared nodes, respectively, comprising:
regarding a shared node of a target user in the
group of users,
determining a requester distance between the
shared node and the requester user;
determining a target distance between the shared
node and the target user;
determining the target weight for the target distance based on the hierarchical depth of the tree
structure;
determining the requester weight based on the
ratio between the requester weight and the
target weight, wherein the requester weight is
different than the target weight; and
determining a distance between the target user and
the requester user based on the requester distance, the requester weight, the target distance,
and the target weight; and
sorting the group of users based on the group of
distances.

2. The method of claim 1, wherein determining the distance between the target user and the requester user based on the requester distance and the target distance comprises:
determining the distance based on multiplication of the requester distance and the requester weight and multiplication of the target distance and the target weight.

3. The method of claim 1, wherein the requester weight is greater than the target weight.

4. The method of claim 1, wherein a user represented by a child node in the tree structure is a subordinate of a user represented by a father node in the tree structure.

5. The method of claim 1, further comprising:
determining an operation that is to be performed on at least one user of the plurality of users; and
in accordance with determining the requester user selects the at least one user in the group of sorted users, performing the operation on the selected at least one user.

6. The method of claim 5, wherein the operation comprises at least one of: a communication operation, an authorization operation and an invitation operation.

7. The method of claim 1, wherein the ratio between the requester weight and the target weight is the hierarchical depth of the tree structure.

8. The method of claim 1, wherein the ratio between the requester weight and the target weight is one less than the hierarchical depth of the tree structure.

9. A device, the device comprising:
at least one processor;
a volatile memory; and
a memory coupled to the at least one processor and having instructions stored thereon, the instructions, when executed by the at least one processor, causing the device to perform acts for managing a plurality of users of an application system, the acts comprise:
determining among the plurality of users a group of users matching a search keyword from a requester user, the search keyword comprising at least one part of an identifier of a desired user;
determining a requester layer of the requester user in a tree structure comprising hierarchical relations among the plurality of users, respectively;
determining a hierarchical depth of the tree structure;
determining a group of layers of the group of users in the tree structure; and
sorting the group of users based on the requester layer and the group of layers, comprising:
determining a ratio between a requester weight and a target weight based on the hierarchical depth of the tree structure;
determining a group of shared nodes between the group of users and the requester user based on the requester layer and the group of layers, respectively, a shared node in the group of shared nodes representing a father node with a shortest distance shared between a user in the group of users and the requester user; and
sorting the group of users based on the group of shared nodes, comprising:
determining a group of distances between the group of users and the requester user based on the group of shared nodes, respectively, comprising:
regarding a shared node of a target user in the group of users,
determining a requester distance between the shared node and the requester user;
determining a target distance between the shared node and the target user;
determining the target weight for the target distance based on the hierarchical depth of the tree structure;
determining the requester weight based on the ratio between the requester weight and the target weight, wherein the requester weight is different than the target weight; and
determining a distance between the target user and the requester user based on the requester distance, the requester weight, the target distance, and the target weight; and
sorting the group of users based on the group of distances.

10. The device of claim 9, wherein determining the distance between the target user and the requester user based on the requester distance and the target distance comprises:
determining the distance based on multiplication of the requester distance and the requester weight and multiplication of the target distance and the target weight.

11. The device of claim 9, wherein the requester weight is greater than the target weight.

12. The device of claim 9, wherein a user represented by a child node in the tree structure is a subordinate of a user represented by a father node in the tree structure.

13. The device of claim 9, wherein the acts further comprise:
determining an operation that is to be performed on at least one user of the plurality of users; and
in accordance with determining the requester user selects the at least one user in the group of sorted users, performing the operation on the selected at least one user.

14. The device of claim 9, wherein the ratio between the requester weight and the target weight is one less than the hierarchical depth of the tree structure.

15. A computer program product, tangibly stored on a non-transient computer-readable medium and comprising machine executable instructions, which when executed by a processor, cause the processor to perform operations, the operations comprising:

determining among a plurality of users a group of users matching a search keyword from a requester user, the search keyword comprising at least one part of an identifier of a desired user;

determining a requester layer of the requester user in a tree structure comprising hierarchical relations among the plurality of users;

determining a hierarchical depth of the tree structure;

determining a group of layers of the group of users in the tree structure, respectively; and sorting the group of users based on the requester layer and the group of layers, comprising:

determining a group of shared nodes between the group of users and the requester user based on the requester layer and the group of layers, respectively, a shared node in the group of shared nodes representing a father node with a shortest distance shared between a user in the group of users and the requester user; and sorting the group of users based on the group of shared nodes, comprising:

determining a ratio between a requester weight and a target weight based on the hierarchical depth of the tree structure;

determining a group of distances between the group of users and the requester user based on the group of shared nodes, respectively, comprising:

regarding a shared node of a target user in the group of users, determining a requester distance between the shared node and the requester user;

determining a target distance between the shared node and the target user;

determining the target weight for the target distance based on the hierarchical depth of the tree structure;

determining the requester weight based on the ratio between the requester weight and the target weight, wherein the requester weight is different than the target weight; and determining a distance between the target user and the requester user based on the requester distance, the requester weight, the target distance, and the target weight; and sorting the group of users based on the group of distances.

16. The computer program product of claim 15, wherein determining the distance between the target user and the requester user based on the requester distance and the target distance comprises:

determining the distance based on multiplication of the requester distance and the requester weight and multiplication of the target distance and the target weight.

17. The computer program product of claim 15, wherein the requester weight is greater than the target weight.

18. The computer program product of claim 15, wherein a user represented by a child node in the tree structure is a subordinate of a user represented by a father node in the tree structure.

19. The computer program product of claim 15, further comprising:

determining an operation that is to be performed on at least one user of the plurality of users; and in accordance with determining the requester user selects the at least one user in the group of sorted users, performing the operation on the selected at least one user.

20. The computer program product of claim 19, wherein the operation comprises at least one of: a communication operation, an authorization operation and an invitation operation.

* * * * *